July 13, 1965   B. F. GILBREATH   3,195,029
SERIES MOTOR CONTROL
Filed Sept. 10, 1962

Benjamin F. Gilbreath
INVENTOR

BY John A. Graham
ATTORNEY

United States Patent Office 3,195,029
Patented July 13, 1965

3,195,029
SERIES MOTOR CONTROL
Benjamin F. Gilbreath, Richardson, Tex., assignor to Texas Instruments Incorporated, Dallas, Tex., a corporation of Delaware
Filed Sept. 10, 1962, Ser. No. 222,706
5 Claims. (Cl. 318—246)

This invention relates to apparatus for supplying direct current to a load from an alternating current source, and more particularly to circuits using controlled rectifiers adapted for supplying series motors.

It is the principal object of this invention to provide an improved motor control circuit. Another object is to provide a series motor supply arrangement employing semiconductor controlled rectifiers which is simple and inexpensive yet results in excellent speed regulation under widely varying loads. A further object is to provide a full-wave supply for a series motor having good regulation characteristics but employing only a single controlled rectifier.

In accordance with this invention, a highly inductive load, such as a series motor, is connected in series with a full-wave rectifier and a controlled rectifier, with the anode of the controlled rectifier being adjacent the motor armature. The control electrode of the controlled rectifier is supplied with triggering pulses from an arrangement including a resistor-capacitor circuit shunting the anode and cathode of the rectifier along with a threshold trigger device connected between the capacitor and the control electrode. This threshold device may be a unijunction transistor having base-to-base bias supplied by reference means such as a Zener diode connected across the full-wave source. This arrangement provides feedback related to the motor inductive effect while also ensuring that the rectifier conducts some during each half cycle. Under heavy motor load conditions, the inductive feedback effect ensures that the controlled rectifier will conduct for the full 180° in each half cycle so that a full-wave supply is provided to the motor.

Figure 1:
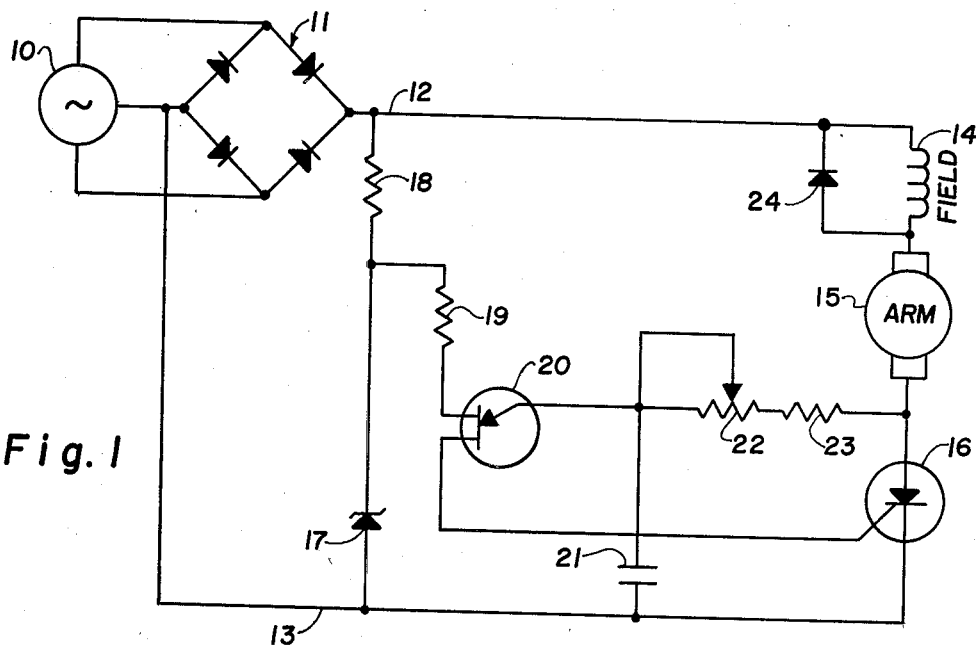
Figure 2:
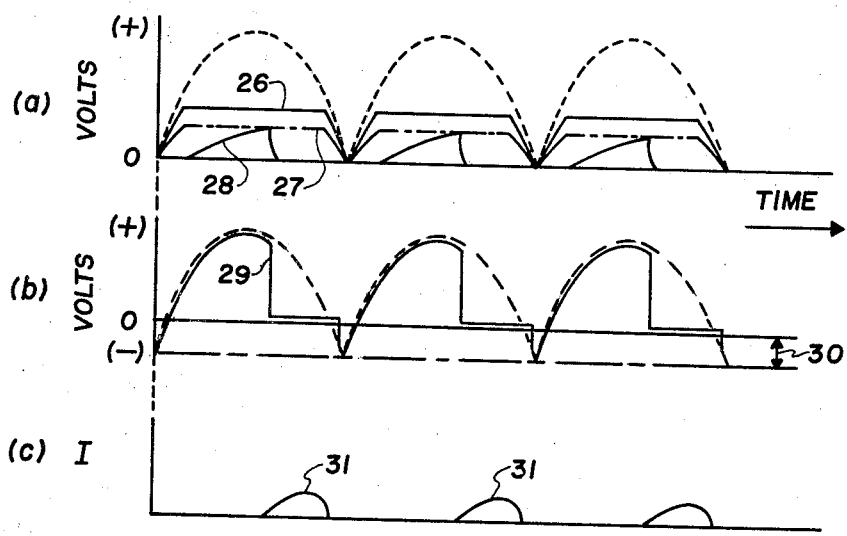

The novel features which are believed to be characteristic of this invention are set forth in the appended claims. The invention may best be understood, however, from the following detailed description of an illustrative embodiment, when read in conjunction with the accompanying drawing, wherein:

FIGURE 1 is a schematic diagram of a series motor control circuit according to this invention; and FIGURES 2a–2c are waveforms appearing in the circuit of FIGURE 1, exaggerated in scale for illustrative purposes.

With reference to FIGURE 1, a series motor control circuit is illustrated which uses the controlled rectifier firing arrangement of this invention. An alternating current source 10 is connected by a full-wave bridge rectifier 11 to positive and negative supply lines 12 and 13. A field winding 14 and an armature winding 15 of a D.C. series motor are connected across the lines 12 and 13, with the anode-cathode path of a PNPN controlled rectifier 16 being connected in series with the motor. It is seen that motor current can flow in this circuit only when the SCR 16 conducts. The arrangement for firing the controlled rectifier includes a reference source provided by a Zener diode 17 connected in series with a resistor 18 across the lines 12 and 13. The cathode of the Zener diode is connected through a resistor 19 to the second base electrode of a unijunction transistor 20. The first base electrode of the unijunction device is directly connected to the gate of the SCR 16. The emitter of the unijunction transistor 20 is connected to one terminal of a capacitor 21, the capacitor being connected in shunt with the anode and cathode of the controlled rectifier 16 by a variable resistor 22 and a fixed resistor 23. A diode 24 shunts the series field winding 14 of the motor to provide a path for field current during the period after the voltage between the lines 12 and 13 has decreased to a value such that the SCR 16 would ordinarily have cut off. This continuation of field current maintains a back E.M.F. across the armature, since a magnetic field is necessary for this effect.

In operation, the controlled rectifier 16 will fire when the anode is positive with respect to the cathode and a current pulse is applied to the gate. This current pulse is supplied under certain conditions by discharge of the capacitor 21 through the emitter and first base path of the unijunction device to the gate of the controlled rectifier 16. The unijunction transistor 20 will exhibit a high impedance from emitter to first base, preventing the capacitor 21 from discharging, until the emitter-to-base voltage exceeds a value related to the intrinsic stand-off ratio times the base-to-base voltage. At this point, carriers are injected into the region between the emitter and the first base, resulting in a large reduction in the impedance appearing between these two terminals and allowing the capacitor 21 to discharge through the gate-cathode path of the SCR 16. The triggering voltage of the unijunction transistor 20 is lowered, according to the stand-off ratio, when the bias between first and second bases is lowered. In the FIGURE 1 circuit, this bias is established by the voltage across the Zener diode 17, which will exhibit a waveform 26 as seen in FIGURE 2a. That is, the base-to-base bias on the transistor 20 will follow the rectified sine wave of the source 10 until the back breakdown voltage of the diode 17 is reached, then will be a constant value until late in each half cycle as the sine wave decreases to zero. The triggering voltage for the unijunction device 20 will follow a line 27 corresponding to the waveform 26, and it is seen that during the major portion of each half cycle a given voltage is needed to cut on the transistor 20 but a much lower voltage is necessary toward the end of each half cycle. This feature is used to ensure that the SCR fires during each half cycle, providing smoother operation.

The voltage across the capacitor 21, resembling a sawtooth waveform 28 as seen in FIGURE 2a, begins to build up as soon as the anode-cathode voltage across the controlled rectifier 16 goes positive. The rate of charge will be determined by the resistors 22 and 23 and the back E.M.F. of the motor. When the capacitor voltage reaches the triggering voltage of waveform 27, related to the stand-off ratio, the controlled rectifier will be fired by the capacitor discharge current pulse. If the resistor 22 is set at a low value, and the motor speed is low, firing will occur early in the half cycle, while high resistance in the charging path and/or high motor speed will retard firing.

The anode-cathode voltage of the SCR 16, shown in a waveform 29 of FIGURE 2b, will partly follow a full-wave-rectified sine wave which is displaced from zero by a level 30 representing the back E.M.F. of the motor. When the SCR fires, the anode-cathode voltage will of course be virtually zero. It is noted from the waveform 29 that the controlled rectifier continues to conduct even after the anode-cathode voltage would tend to be negative. This is due to the inductive effect of the armature which tends to maintain current flow in the same direction once it is established. The armature current, or SCR current, is shown by a waveform 31 of FIGURE 2c. The inductance of the motor armature will be directly related to the motor load, so the length of time which current continues to flow will also be related to the motor load. When the motor speed is low, the back E.M.F. level 30 will be small, and so the anode-cathode voltage of the SCR will go positive soon after it has passed through zero in a negative-going direction. This effect, coupled with the increased energy stored in the inductances of the motor may cause the armature current to continue into the next half cycle, preventing the SCR from being turned off at all. This mode of operation is desirable, since under these conditions 100% conduction is necessary.

Although this invention has been described with reference to a particular embodiment, this description is merely illustrative of the principles involved and is not meant to be construed in a limiting sense. Various modifications of the illustrative embodiment, as well as other embodiments of the invention, will be apparent to persons skilled in the art upon reading this specification. Accordingly, it is contemplated that the appended claims will be interpreted to cover any such modifications or embodiments as fall within the time scope of the invention.

What is claimed is:
1. A control circuit for a motor wherein a field winding and an armature winding are connected in series comprising:
   (a) a controlled rectifier having anode, cathode and gate electrodes,
   (b) a pair of terminals adapted to be connected to a source of full-wave rectified alternating current,
   (c) means connecting the motor in a series circuit with the anode and cathode of the controlled rectifier and for connecting the series circuit across the pair of terminals, the anode being adjacent the armature winding,
   (d) resistance means and a capacitor connected across the anode and cathode electrodes,
   (e) a resistor and a Zener diode connected in series across the pair of terminals, and
   (f) a unijunction transistor having one base connected to the juncture of the resistor and Zener diode and having a second base connected to the gate electrode, the emitter of the transistor being connected to the juncture of the capacitor and the resistance means.

2. A control circuit for a series motor comprising:
   (a) a source of pulsating unidirectional voltage,
   (b) a PNPN controlled rectifier having anode, cathode and gate electrodes,
   (c) means connecting the motor in a closed series circuit with the anode and cathode of the controlled rectifier and the source, the anode being adjacent the motor armature in the series circuit,
   (d) resistance means and a capacitor serially connected in the named order across the anode and the cathode electrodes,
   (e) a resistor and a constant voltage device connected in series across the source, and
   (f) a unijunction transistor having one base connected to the juncture of the resistor and the constant voltage device and having the second base connected to the gate electrode, the emitter of the unijunction transistor being connected to the juncture of the capacitor and the resistance means.

3. Apparatus according to claim 2 wherein a diode shunts the motor field in the reverse direction so that a magnetic field is maintained by inductive discharge to ensure that the motor armature produces a back E.M.F.

4. Motor control apparatus comprising:
   (a) a motor having an armature winding and a field winding connected in series,
   (b) a PNPN controlled rectifier having an anode, a cathode and a gate,
   (c) first and second supply terminals adapted to be connected to positive and negative terminals, respectively, of a pulsating unidirection source provided by an A.C. source with a full-wave rectifier,
   (d) conductive means connecting the cathode of the controlled rectifier to the second terminal, connecting the field winding to the first terminal, and connecting the anode of the controlled rectifier to the armature winding,
   (e) a diode shunting the field winding in the reverse direction,
   (f) a resistor and a Zener diode connected in series across the first and second terminals,
   (g) a unipolar transistor having first and second base electrodes and an emitter electrode,
   (h) conductive means connecting the first base to the juncture of the resistor and the Zener diode and connecting the second base to the gate of the controlled rectifier,
   (i) resistance means and a capacitor serially connected in the named order between the anode and the cathode of the controlled rectifier
      (A) whereby the capacitor charges during each half cycle when the controlled rectifier is not conducting, and
   (j) means connecting the juncture of the capacitor and resistance means to the emitter of the unijunction transistor whereby the capacitor may discharge through the gate-cathode path when the capacitor has charged to a value related to the stand-off ratio of the transistor and the base-to-base voltage thereof.

5. A full-wave supply circuit for a series motor comprising:
   (a) an alternating current source,
   (b) a full-wave bridge rectifier having an input connected to the A.C. source and pair of output terminals,
   (c) a PNPN controlled rectifier having an anode, a cathode and a gate,
   (d) means connecting the series motor and the anode and cathode of the controlled rectifier in series across the pair of output terminals with the anode being adjacent the motor armature,
   (e) means connected to the anode for charging a capacitor during each half cycle when the controlled rectifier is nonconductive, and
   (f) means including a threshold trigger device connected to the capacitor for allowing the capacitor to discharge through the gate-cathode of the controlled rectifier when the charge has reached a triggering level which is dependent upon the elapsed time in the half cycle.

References Cited by the Examiner
UNITED STATES PATENTS
3,095,534   6/63   Cockrell _____ 321—19

OTHER REFERENCES
Publication: GE SCR Manual, 2d edition, Auburn, New York, 1961, TK 2798 G4g, 1961, pp. 95–96, 115–117, 125–127.

ORIS L. RADER, *Primary Examiner.*